United States Patent
Makino

(10) Patent No.: US 7,959,141 B2
(45) Date of Patent: Jun. 14, 2011

(54) STAGE APPARATUS

(75) Inventor: Fuminori Makino, Yokosuka (JP)

(73) Assignee: Sumitomo Heavy Industries, Ltd., Shinagawa-Ku, Tokyo (JP)

( * ) Notice: Subject to any disclaimer, the term of this patent is extended or adjusted under 35 U.S.C. 154(b) by 125 days.

(21) Appl. No.: 12/318,251

(22) Filed: Dec. 23, 2008

(65) Prior Publication Data

US 2010/0155560 A1 Jun. 24, 2010

(51) Int. Cl.
*B23Q 3/18* (2006.01)

(52) U.S. Cl. .................. 269/58; 269/60; 269/61

(58) Field of Classification Search .............. 269/58, 269/21, 59, 60, 71, 289 R
See application file for complete search history.

(56) References Cited

U.S. PATENT DOCUMENTS

| | | | | |
|---|---|---|---|---|
| 4,492,356 A | * | 1/1985 | Taniguchi et al. | 248/346.06 |
| 4,766,465 A | * | 8/1988 | Takahashi | 355/53 |
| 5,623,853 A | * | 4/1997 | Novak et al. | 74/490.09 |
| 5,760,564 A | * | 6/1998 | Novak | 318/687 |
| 5,839,324 A | * | 11/1998 | Hara | 74/490.09 |
| 5,996,437 A | * | 12/1999 | Novak et al. | 74/490.09 |
| 6,323,935 B1 | * | 11/2001 | Ebihara et al. | 355/53 |

FOREIGN PATENT DOCUMENTS

JP 3-245932 11/1991

* cited by examiner

*Primary Examiner* — Lee D Wilson
(74) *Attorney, Agent, or Firm* — Squire Sanders & Dempsey (US) LLP

(57) ABSTRACT

The present invention reduces the footprint of a stage apparatus to achieve a more compact apparatus. Using a Y-axis shaft having a magnet on the inside and a Y-axis mover constituted by a coil that surrounds the Y-axis shaft as a Y-axis drive part for moving a Y-axis movable body makes the drive part smaller than a linear motor. Consequently, a lateral part that faces a side gliding surface is arranged downwardly of the one Y-axis mover, to thereby eliminate the footprint occupied by the lateral part when lined up side-by-side with the Y-axis drive part.

6 Claims, 5 Drawing Sheets

STAGE APPARATUS

BACKGROUND OF THE INVENTION

1. Field of the Invention

The present invention relates to a stage apparatus for moving a movable body in the XY directions on a base.

2. Related Background Art

Conventionally, a stage apparatus, which comprises a base, a fixed guide that is fixed to the one side of the base extending in the Y-axis direction, a linear motor (Y-axis drive part), which is constituted from a stator attached to the outer side of the fixed guide, a stator attached to the base on the side opposite the above-mentioned the one side, and a pair of movers that are respectively opposed to the stators from above and move along the Y-axis direction; a Y-stage (Y-axis movable body) that is connected to the pair of movers and moves in the Y-axis direction, a constant pressure air bearing mount plate, which is fixed to the bottom of the Y-stage and is disposed on the inner sides of the two sides of the base, and an X-stage (X-axis movable body) that moves parallel to the Y-stage in the X-axis direction, is known (For example, refer to Japanese Patent Application Laid-open No. H3-245932).

However, the problem with the above-described stage apparatus is that the apparatus occupies a large area (has a large footprint) in the X-axis direction in which the base, fixed guide and stators are arranged in a row, and can prove problematic in terms of the space required when transporting and installing the apparatus.

SUMMARY OF THE INVENTION

An object of the present invention, which is constituted to solve this problem, is to provide a stage apparatus that makes it possible to reduce this footprint to achieve a more compact apparatus.

A stage apparatus related to the present invention comprises: a base that has a top surface and a side surface extending along a Y-axis direction as gliding surfaces; a Y-axis drive part having a pair of Y-axis shafts which have magnets on the inside and extend along the Y-axis direction, and a pair of Y-axis movers, respectively constituted by coils that surround the Y-axis shafts; a Y-axis movable body, which has a main body part that is connected to the pair of Y-axis movers on the top surface of the base, and a lateral part that is connected to the Y-axis mover and faces the side of the base, and which moves in the Y-axis direction along the top surface of the base and side of the base; and an X-axis movable body that moves along the main body part in an X-axis direction, which is a horizontal direction that is orthogonal to the Y-axis direction, and the lateral part is characterized by being disposed downwardly of the Y-axis movers.

According to a stage apparatus like this, because a Y-axis shaft having magnets on the inside and a Y-axis mover comprising coils that surround this Y-axis shaft are utilized as the Y-axis drive part that moves the Y-axis movable body, the drive part can be made smaller than a linear motor, and therefore the lateral part of the Y-axis movable body facing the side of the base can be disposed downwardly of the one Y-axis mover, making it possible to eliminate the footprint in the X-axis direction occupied by the lateral part when the lateral part is lined up side-by-side with the Y-axis drive part. Consequently, the footprint can be reduced to make the apparatus more compact.

Further, it is preferable that attraction force generating means for generating a force to cause mutual attraction between the side of the base and the lateral part of the Y-axis movable body be provided therebetween. According to a constitution like this, disposing repulsive force generating means (an air bearing or the like) corresponding to attraction force generating means on the lateral part of the one Y-axis movable body so as to achieve a balance makes it possible to achieve a more compact apparatus than when repulsive force generating means are disposed on both sides.

It is preferable that attraction force generating means, for example, be constituted from one of either a magnet or a magnetic body disposed on the side of the base and extending in the Y-axis direction, and the other of either the magnet or the magnetic body disposed on the lateral part of the Y-axis movable body.

Further, it is preferable that the lateral part of the Y-axis movable body support, on the outside of the lateral part, an air bearing for blowing air on the side of the base. According to a constitution like this, because the structure is such that an air bearing is supported on the outside of the lateral part, manufacture and maintenance are easier than with a structure in which the air bearing is embedded on the inside of the lateral part.

It is preferable that the lateral part of the Y-axis movable body have a support part for rotatably supporting an air bearing. According to a constitution like this, even if the precision of the base and movable body are low and the support part is inclined toward the side of the base, the balance between the repulsive force and the attraction force is maintained between the side of the base and the air bearing while the air bearing rotates, making it possible to move the movable body while properly maintaining the spacing of the gap between the side of the base and the air bearing. According to the above, the base and movable body can be readily processed and assembled without the need for processing precision or assembly precision.

Further, it is preferable that the support part support the air bearing by way of a spherically shaped part. Consequently, since the air bearing is supported via a spherically shaped part in the support part that constitutes the lateral part of the movable body, the air bearing can freely rotate in a three-dimensional direction around the part that makes contact with the spherically shaped part.

Further, it is preferable that the air bearing be supported in the support part by elasticity being imparted from an expandable elasticity imparting part disposed surrounding the spherically shaped part. Consequently, the air bearing can be supported by allowing the air bearing to make contact with the spherically shaped part at the optimum force, and when the air bearing rotates three-dimensionally around the part that makes contact with the spherically shaped part, the elasticity imparting part expands and contracts to allow the rotation, making it possible to reliably support the air bearing without impeding the operation of the air bearing.

DESCRIPTION OF THE PREFERRED EMBODIMENTS

The preferred embodiment of a stage apparatus according to the present invention will be explained below while referring to the attached drawings.

Figure 1:
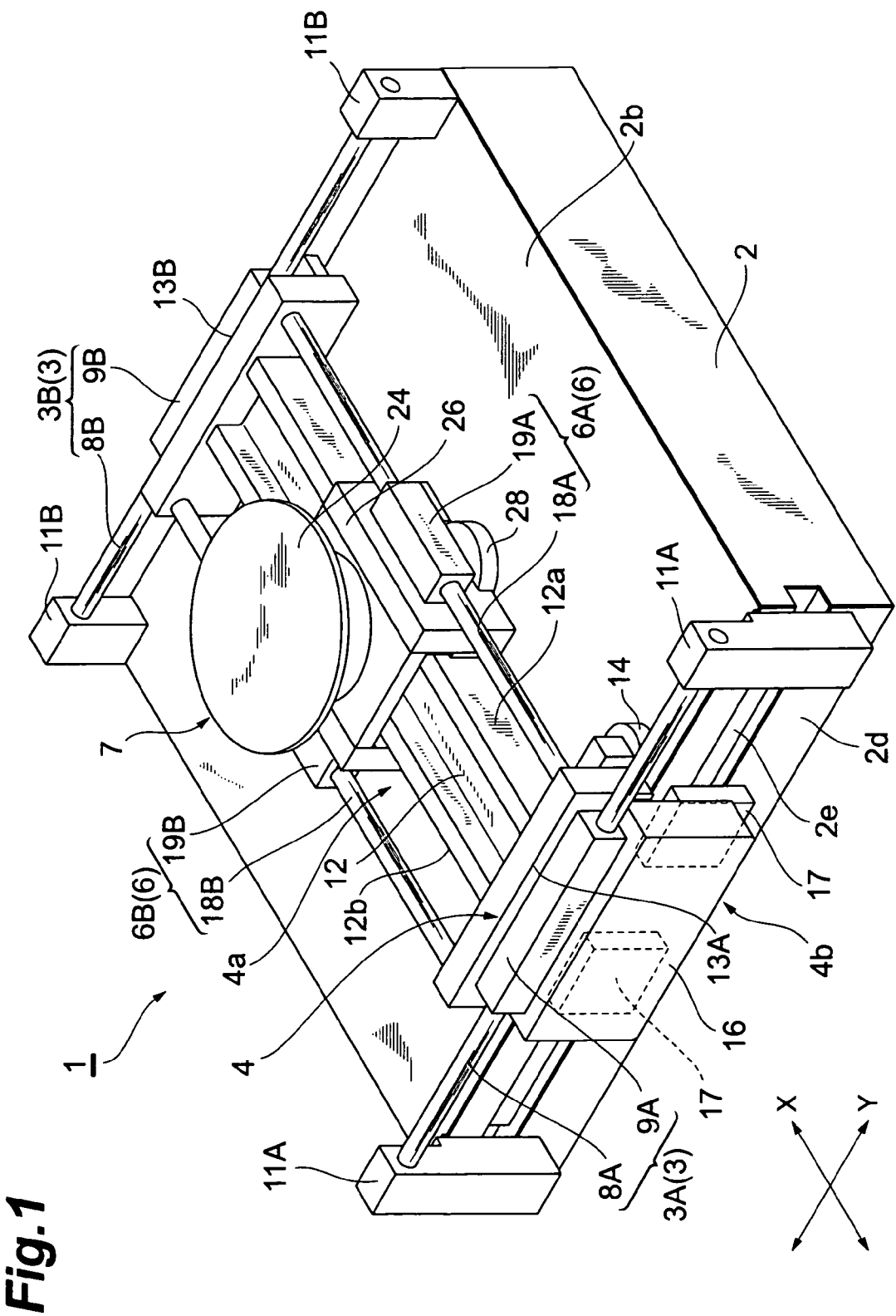
FIG. 1 is an oblique view showing a stage apparatus related to an embodiment of the present invention.
Figure 2:
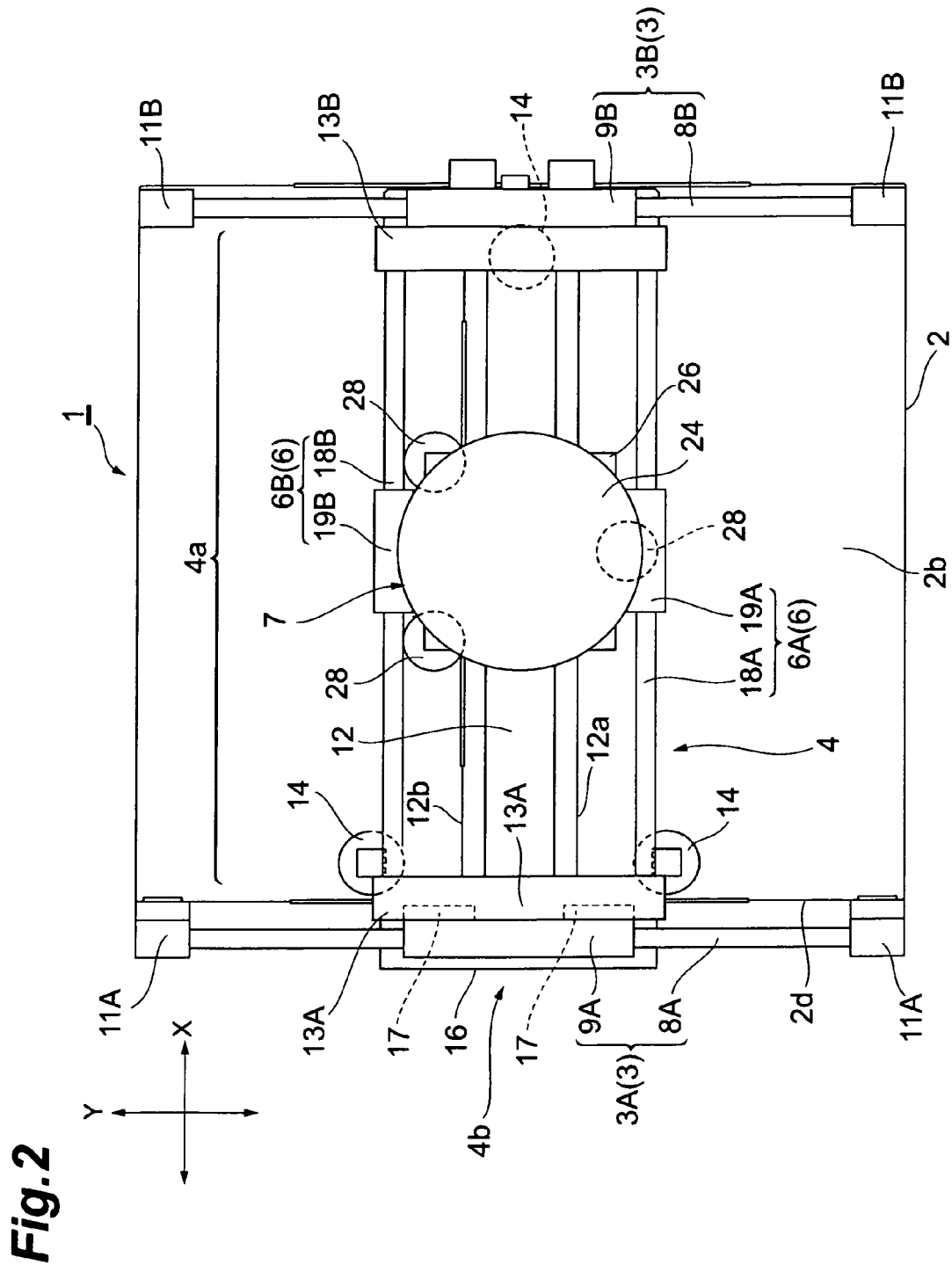
FIG. 2 is a plan view of the stage apparatus shown in FIG. 1.
Figure 3:
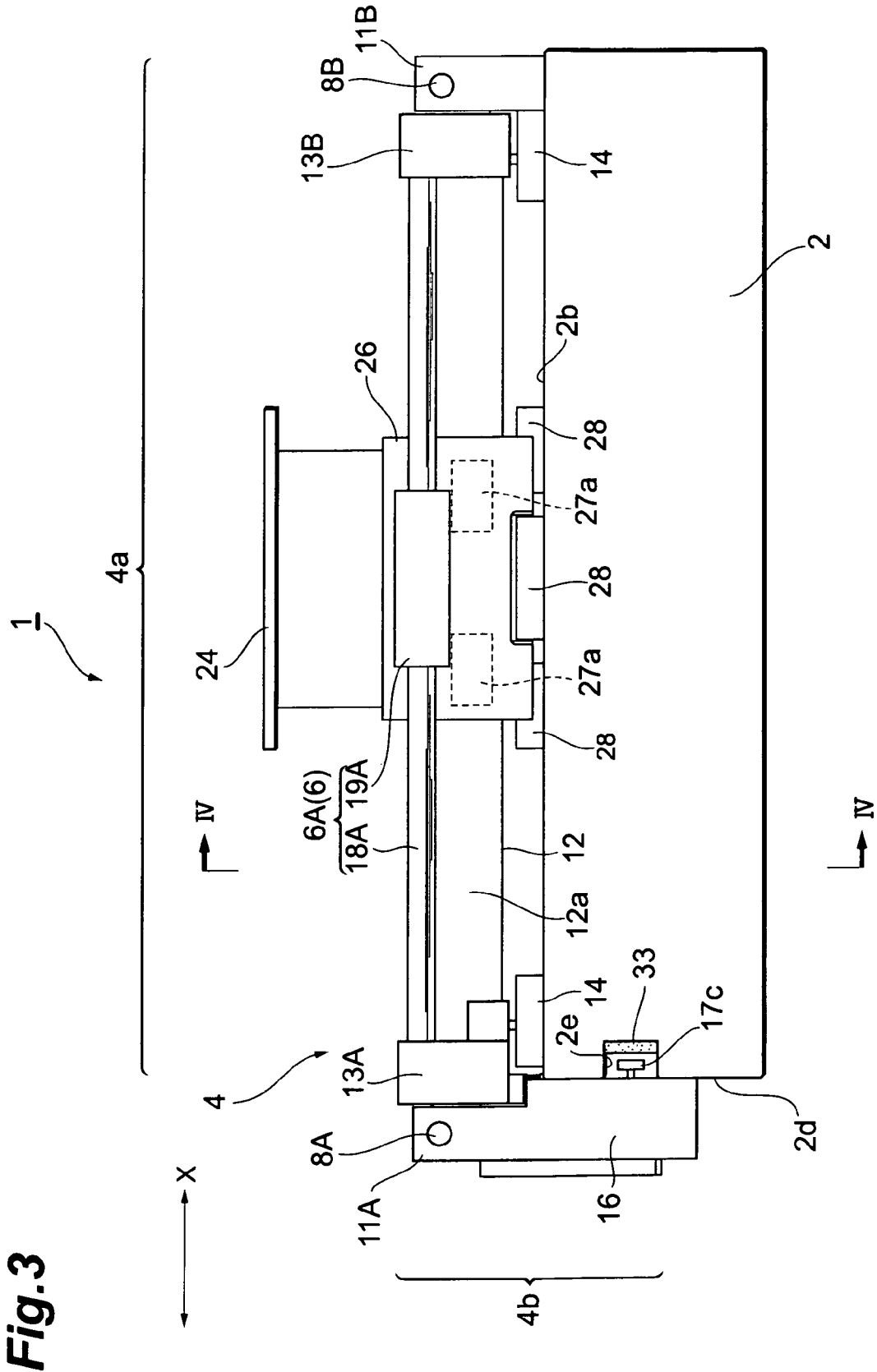
FIG. 3 is a side view of the stage apparatus shown in FIG. 1.
Figure 4:
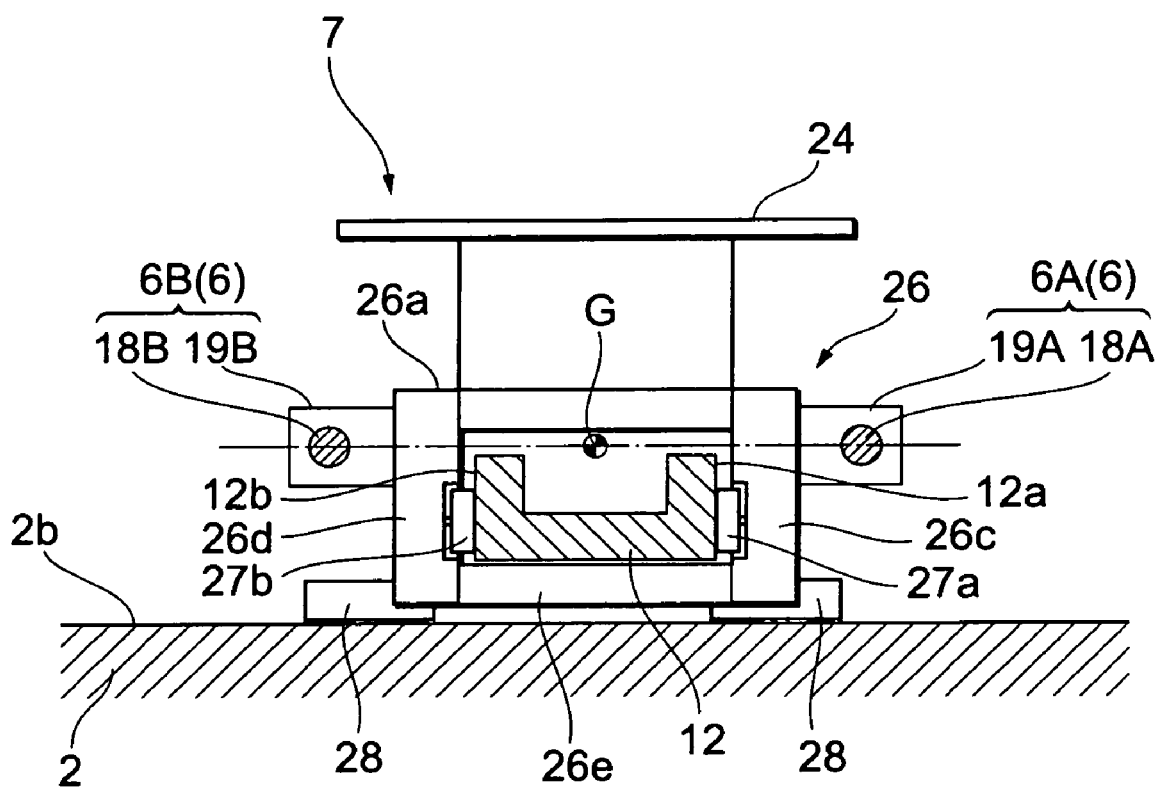
FIG. 4 is a cross-sectional view along line IV-IV of FIG. 3.

FIG. 1 is an oblique view showing a stage apparatus related to the embodiment of the present invention, FIG. 2 is a plan view of the stage apparatus shown in FIG. 1, FIG. 3 is a side view of the stage apparatus shown in FIG. 1, and FIG. 4 is a cross-sectional view along line IV-IV of FIG. 3.

As shown in FIG. 1, a stage apparatus 1 comprises a base 2; a Y-axis drive part 3 comprising a pair of Y-axis shaft motors 3A, 3B; a Y-axis movable body 4 that is moved in the Y-axis direction by the Y-axis drive part 3; an X-axis drive part 6 comprising a pair of X-axis shaft motors 6A, 6B disposed on the Y-axis movable body 4; and an X-axis movable body (movable body) 7 that is moved in the X-axis direction by the X-axis drive part 6. Furthermore, in the drawing, the direction in which the X-axis shaft motors 6A, 6B extend is the X-axis direction, and the horizontal direction that is orthogonal to the X-axis direction is the Y-axis direction.

The base 2 is made from a rectangular plate-like stone material, and a top gliding surface (top surface) 2b on which the air bearing glides is formed on the top surface thereof by carrying out planar processing. Further, of the sides extending along the Y-axis direction, a side gliding surface 2d on which the air bearing glides is also formed on the one side by carrying out the same planar processing as that done on the top surface. A groove part 2e extending along the Y-axis direction is formed in this side gliding surface 2d. A magnetic body 33 extending along the Y-axis direction is disposed inside this groove part 2e (Refer to FIG. 5).

The Y-axis shaft motors 3A, 3B constituting the Y-axis drive part 3 comprise a pair of Y-axis shafts (Y-axis stators) 8A, 8B extending along the Y-axis direction that have magnets built inside them, and Y-axis movers 9A, 9B disposed so as to surround portions of the Y-axis shafts 8A, 8B extending axially.

As shown in FIGS. 1 and 2, the Y-axis shafts 8A, 8B are formed by respectively disposing a plurality of magnets along the Y-axis direction upwardly and on both sides of the base 2 in the X-axis direction. These magnets are joined together north pole to north pole and south pole to south pole, and these joined magnets are lined up side by side in a row arrangement. The Y-axis shaft 8A on the side of the side gliding surface 2d is held at both ends by a pair of holding members 11A respectively fixed longitudinally at both sides of the side gliding surface 2d, and are arranged on the outer side of the base 2 as seen from above. Similarly, the other Y-axis shaft 8B is also held at both ends by a pair of holding members 11B arranged in a standing position on the base 2.

The Y-axis movers 9A, 9B are respectively constituted by placing coils that surround the Y-axis shafts 8A, 8B inside housings. The Y-axis movers 9A, 9B respectively move in the Y-axis direction in accordance with electromagnetic interaction generated by running electric current through the coils to create electromagnetic forces with the Y-axis shafts 8A, 8B, which comprise magnets.

As shown in FIGS. 1 through 3, the Y-axis movable body 4 has a main body part 4a facing the top gliding surface 2b of the base 2 and a lateral part 4b facing the side gliding surface 2d. The main body part 4a and lateral part 4b are constituted from different components, making for ease of manufacture and maintenance. The main body part 4a of the Y-axis movable body 4 comprises an X-axis drive part 6; a guidebeam 12 connected to the Y-axis movers 9A, 9B for guiding the X-axis mover 7; and a Y-axis lift air bearing 14 for supporting the Y-axis mover 4 in the up-down direction.

The X-axis shaft motors 6A, 6B constituting the X-axis drive part 6 comprise a pair of X-axis shafts 18A, 18B extending along the X-axis direction that have magnets on the inside; and X-axis movers 19A, 19B disposed so as to surround portions of the X-axis shafts 18A, 18B extending axially.

The X-axis shafts 18A, 18B are formed by disposing a plurality of magnets along the X-axis direction, and are connected to the Y-axis movers 9A, 9B by way of support members 13A, 13B. These magnets are joined together north pole to north pole and south pole to south pole, and these joined magnets are lined up side by side in a row arrangement.

The X-axis movers 19A, 19B are respectively constituted by placing coils that surround the X-axis shafts 18A, 18B inside housings. The X-axis movers 19A, 19B respectively move in the X-axis direction in accordance with electromagnetic interaction generated by running electric current through the coils to create electromagnetic forces with the X-axis shafts 18A, 18B, which comprise magnets.

The guidebeam 12 has a cross-sectional U-shape that is open towards the top as shown in FIGS. 1 through 4, and gliding surfaces 12a, 12b for the air bearing to glide on are formed by subjecting the outer sides of both sides extending along the X-axis direction to planar processing. Further, the guidebeam 12 is arranged between the X-axis shaft 18A and the X-axis shaft 18B as seen from above, is positioned so as to be housed on the inner side of a rectangle-shaped annular X-axis movable body 7, and is respectively connected to the Y-axis movers 9A, 9B at both ends in the longitudinal direction thereof by way of support members 13A, 13B.

Two Y-axis lift air bearings 14 are disposed at the ends of the Y-axis movable body 4 separated in the Y-axis direction on the lateral part 4b side of the main body part 4a, and one Y-axis lift air bearings 14 is disposed in the center of the Y-axis movable body 4 at the other end of the main body part 4a, and support the Y-axis movable body 4 in a non-contact state while providing a gap of around several micrometers between the Y-axis movable body 4 and the top gliding surface 2b by blowing air or another such gas onto the top gliding surface 2b to generate a repulsive force that balances the downward force resulting from the weight Y-axis movable body 4 itself. Furthermore, the air bearing does not only blow air, but can also have a suction function.

As shown in FIGS. 1 through 4, the X-axis movable body 7 comprises a rectangle-shaped annular moving member 26 surrounding the guidebeam 12; and a stage 24, which is disposed on the top of the moving member 26, and on which a wafer or the like is placed. As shown in FIG. 4, the moving member 26 has lateral parts 26c, 26d facing the gliding surfaces 12a, 12b of the guidebeam 12, and the surface of the outer side of lateral part 26c is connected to X-axis mover 19A, the surface of the outer side of lateral part 26d is connected to X-axis mover 19B, and the moving member 26 moves together with the X-axis movers 19A, 19B. Thus, the physical relationship between the X-axis movable body 7 and the X-axis drive part 6 is a relationship in which the X-axis shafts 18A, 18B and X-axis movers 19A, 19B are respectively arranged in both outer sides of the X-axis movable body 7. Further, the height of the gravitational center G of the X-axis movable body 7 coincides with the heights of the shaft centers of the X-axis shafts 18A, 18B and the X-axis movers 19A, 19B.

The X-axis movable body 7 respectively comprises on the inner sides of the lateral parts 26c, 26d of the moving member 26 two each X-axis yaw air bearings (first air bearings) 27a, 27b for blowing air on gliding surfaces 12a, 12b (Refer to FIG. 3). Further, the X-axis movable body 7 comprises three X-axis lift air bearings (second air bearings) 28 on the side of the bottom surface 26e of the moving member 26 for blowing air on the top gliding surface 2b of the base 2 (Refer to FIG. 2). Two are disposed separated in the X-axis direction on lateral part 26d, and one is disposed in the center of lateral part 26c in the X-axis direction. The X-axis yaw air bearings 27a, 27b support the X-axis movable body 7 in a non-contact state while providing gaps of around several micrometers between the X-axis movable body 7 and the gliding surfaces 12a, 12b by balancing the repulsive forces from the gliding surfaces 12a, 12b of the guidebeam 12 with one another. Further, the X-axis lift air bearings 28 support the X-axis movable body 7 in a non-contact state while respectively providing gaps of around several micrometers between the X-axis movable body 7 and the top gliding surface 2b of the base 2 by balancing the repulsive force from the top gliding surface 2b of the base 2 with the downward force resulting from the weight of the X-axis movable body 7 itself.

Figure 5:
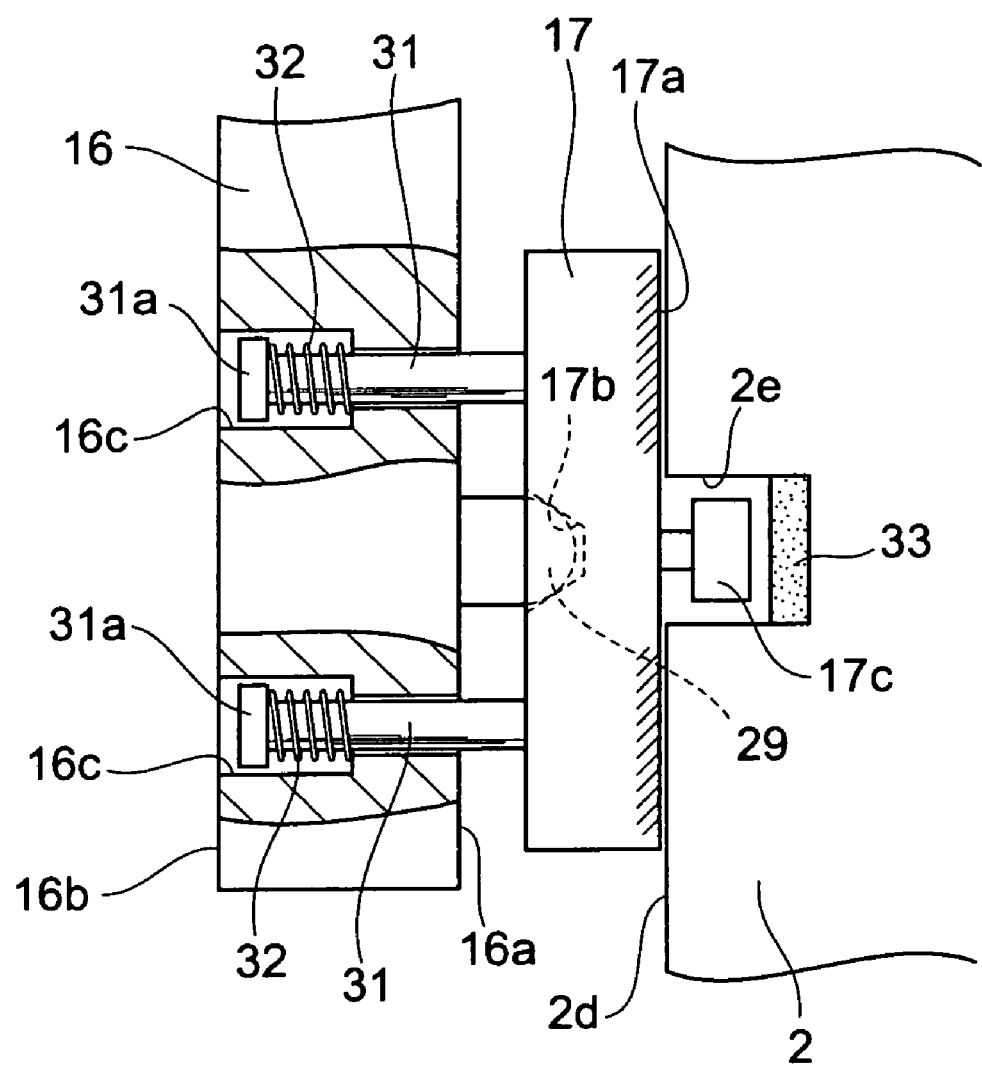
FIG. 5 is an enlarged view of the lateral part of the Y-axis movable body in FIG. 1 as seen from the Y-axis direction.

FIG. 5 is an enlarged view of the lateral part of the Y-axis movable body in FIG. 1 as seen from the Y-axis direction. As shown in FIGS. 1 and 5, the lateral part 4b of the Y-axis movable body 4 comprises a support part 16, which is disposed on the bottom surface of the Y-axis mover 9A and faces the side gliding surface 2d of the base 2. Further, the outer side of the lateral part 4b supports two flat plate-like Y-axis yaw air bearings (air bearings, refer to FIG. 1) 17 lined up side by side in the Y-axis direction for blowing air from blowing surfaces 17a facing the side gliding surface 2d toward the side gliding surface 2d as shown in FIG. 5. The Y-axis yaw air bearings 17 are rotatably supported by the support part 16. An air supply duct not shown in the drawing is connected to the Y-axis yaw air bearing 17, and air is supplied from an external supply device.

A spherically-shaped part 29, which has a spherical shape at the tip and makes contact with the back surface of the Y-axis yaw air bearing 17 is disposed in the face 16a of the Y-axis yaw air bearing 17 side of the support part 16. Further, a plurality of concave parts 16c is disposed around the spherically-shaped part 29 in the face 16b on the opposite side of face 16a, and the concave part 16c is open to the face 16a side in accordance with a throughhole disposed in the support part 16. Then, a pin 31 provided in a protruding condition on the back surface of the Y-axis yaw air bearing 17 is arranged so as to enter inside the concave part 16c through this throughhole. Further, a concave part 17b, which is tapered to become narrower toward the side of the blowing surface 17a, is disposed in the central part of the back surface of the Y-axis yaw air bearing 17, and the spherically-shaped part 29 enters into this concave part 17b. Then, an expandable spring 32 is arranged in a compressed state between the bottom of the concave part 16c of the support part 16 and a flange-shaped end part 31a of the pin 31, and the spring 32 thereby imparts elasticity in the opposite direction of the side gliding surface 2d. Consequently, a force pressing on the spherically-shaped part 29 is imparted by the Y-axis yaw air bearing 17, and the Y-axis yaw air bearing 17 is supported by the support part 16 at a desired pressure by way of the concave part 17b and the spherically-shaped part 29.

Further, a magnet 17c protruding toward the inside of the groove part 2e formed in the side gliding surface 2d is disposed in the central part of the blowing surface 17a. The magnet 17c generates an attraction force with a magnetic body 33 extending along the Y-axis direction at the bottom of the groove part 2e of the side gliding surface 2d. Furthermore, the gap between the magnet 17c and the magnetic body 33 is adjusted by adjusting the amount of protrusion of the magnet 17c, consequently balancing the repulsive force of the Y-axis yaw air bearing 17 and the attraction force of the magnet 17c, and adjusting the gap between the Y-axis yaw air bearing 17 and the side gliding surface 2d.

In the stage apparatus 1 constituted like the above, it is possible to freely move the stage 24 of the X-axis movable body 7 biaxially in accordance with the movements of the Y-axis movable body 4 and X-axis movable body 7 in line with the driving of the Y-axis drive part 3 and the X-axis drive part 6.

Then, according to the stage apparatus 1 of this embodiment, since Y-axis shafts 3A, 3B having magnets inside, and Y-axis movers 9A, 9B comprising coils surrounding these Y-axis shafts 3A, 3B are used as the Y-axis drive part 3 that moves the Y-axis movable body 4, it is possible to make the drive part smaller than a linear motor or the like, and therefore, it is possible to arrange the lateral part 4b of the Y-axis movable body 4 facing the side gliding surface 2d downwardly of the one Y-axis mover 9A, making it possible to eliminate the X-axis direction footprint occupied by the lateral part 4b when lined up side-to-side with the Y-axis drive part 3A. Consequently, it is possible to reduce the footprint of the stage apparatus 1, and to strive to make the apparatus more compact.

Further, the Y-axis yaw air bearing 17, which corresponds to attraction generating means in accordance with a magnet 17c and magnetic body 33, is disposed in the one lateral part of the Y-axis movable body 4, and if a balance is consequently achieved, enabling the apparatus to be made more compact than when a balance is achieved by disposing Y-axis yaw air bearings 17 on both sides.

Further, since the Y-axis yaw air bearing 17 is structured to be supported on the outer side of the lateral part 4b, manufacturing and maintenance are easier than in a structure in which the Y-axis yaw air 5 bearing is embedded on the inner side of the lateral part 4b. In particular, when the Y-axis yaw air bearing 17 is embedded in the support part 16, the air supply duct must pass through the inside of the support part 16, making manufacturing and maintenance difficult, but since the Y-axis yaw air bearing 17 is able to pass the air supply duct through from the outside, manufacturing and maintenance are easy.

Further, even when the precision of the base 2 and Y-axis mobile body 4 are low, and the support part 16 is inclined toward the side gliding surface 2d of the base 2, the repulsive force and attraction force between the side gliding surface 2d and Y-axis yaw are bearing 17 can be balanced while the Y-axis yaw air bearing 17 rotates, and the Y-axis movable body 4 can be moved while properly maintaining the spacing of the gap between the side gliding surface 2d and the Y-axis yaw air bearing 17. According to the above, the base 2 and Y-axis movable body 4 can be readily processed and assembled without the need for processing precision or assembly precision.

Further, since the Y-axis yaw air bearing 17 is supported by way of a spherically-shaped part 29 in the support part 16 constituting the lateral part 4b of the Y-axis movable body 4, it is possible to freely rotate the Y-axis yaw air bearing 17 three-dimensionally around the contact part of the spherically-shaped part 29.

Further, since the Y-axis yaw air bearing 17 is supported by the support part 16 by elasticity being imparted from the expandable spring 32 disposed around the spherically-shaped part 29, it is possible to provide support by bringing the Y-axis yaw air bearing 17 into contact with the spherically-shaped part 29 with optimum force, and when the Y-axis yaw air bearing 17 rotates three-dimensionally around the part that makes contact with the spherically-shaped part 29, the spring 32 expands and contracts to allow this, making it possible to reliably support the support part 16 without impeding the operation of the Y-axis yaw air bearing 17.

Further, this embodiment exhibits the following effects. That is, since a pair of X-axis shafts 18A, 18B and X-axis movers 19A, 19B constituting an X-axis movable body 7 and X-axis drive part 6 are respectively arranged on both outer sides of the X-axis movable body 7, the position of the X-axis movable body 7 can be lowered downwardly in the vertical direction, making it possible to bring the gravitational center location of the X-axis movable body 7 in closer proximity to the height location of the X-axis drive part 6 having the X-axis shafts 18A, 18B and X-axis movers 19A, 19B than in the prior art in which the X-axis movable body is placed on top of the X-axis mover. Consequently, it is possible to stabilize and support the X-axis movable body 7 with the X-axis drive part 6, making it possible to move the X-axis movable body 7 without generating pitching. Further, in the prior art, the X-axis mover is disposed on the inside directly beneath the table, so that the X-axis mover comes into close proximity to the location of the wafer at times and adversely affects this wafer by making it easier for heat to be transferred to sites that demand precision. Further, disposing the X-axis mover inside also increases the risk of heat buildup. By contrast, according to the stage apparatus 1 related to this embodiment, disposing the X-axis movers 19A, 19B on the sides of the X-axis movable body 7 makes it possible distance the X-axis movers 19A, 19B from the wafer location, enabling a constitution in which there is no heat buildup. Further, by there being a pair of shaft motors 6A, 6B, and by this pair of shaft motors 6A, 6B being respectively arranged on both outer sides of the X-axis movable body 7, it is possible to stably move the X-axis movable body 7 in accordance with applying thrust from both outer sides of the X-axis movable body 7.

Further, since the pair of X-axis shafts 18A, 18B and X-axis movers 19A, 19B are respectively arranged on the outer sides of the lateral parts 26c, 26d of the moving member 26 of the X-axis movable body 7, the X-axis movable body 7 can be made smaller and lighter in weight than when the pair of X-axis shafts 18A, 18B and X-axis movers 19A, 19B are respectively arranged on the inner side of the X-axis movable body 7.

Further, since the height of the gravitational center G of the X-axis movable body 7 coincides with the heights of the shaft centers of the X-axis shafts 18A, 18B and X-axis movers 19A, 19B, it is possible to further stabilize and support the X-axis movable body 7 using the X-axis drive part 6, making it possible to move the X-axis movable body 7 without generating pitching.

The present invention has been explained in detail above on the basis of this embodiment, but the present invention is not limited to the above embodiment, and, for example, in the above-described embodiment, the magnet 17c is disposed on the side of the blowing surface 17a of the Y-axis yaw air bearing 17, and the magnetic body 33 is disposed on the side of the side gliding surface 2d of the base 2, but the arrangement of the magnet and the magnetic body can be reversed.

According to the stage apparatus related to the present invention, it is possible to reduce the footprint to achieve a more compact apparatus.

Furthermore, this application relates to and claims the benefit of priority from Japanese Patent Application number 2007-272969 filed on Oct. 19, 2007, the entire disclosure of which is incorporated herein by reference.

What is claimed is:

1. A stage apparatus comprising:
   a base that has a top surface and a side surface extending along a Y-axis direction as gliding surfaces wherein the side surface is arranged on the extreme outer edge of the top surface as seen from above;
   a Y-axis drive part having a first Y-axis shaft and a second Y-axis shaft which have magnets on the inside and extend along the Y-axis direction, and a first Y-axis mover and a second Y-axis mover, respectively constituted by coils that surround the Y-axis shafts;
   a Y-axis movable body, which has a main body part that is connected to the first Y-axis mover and the second Y-axis mover on the top surface of the base, and a lateral part that is connected to the first Y-axis mover and faces the side of the base, and which moves in the Y-axis direction along the top surface of the base and the side of the base;
   an X-axis movable body that moves along the main body part in an X-axis direction, which is a horizontal direction that is orthogonal to the Y-axis direction; and
   attraction force generating means for generating a force to cause mutual attraction between the side of the base and the lateral part of the Y-axis movable body, the attraction force generating means being provided therebetween,
   wherein the first Y-axis shaft is arranged on the outer side of the base from the side surface as seen from above,
   wherein the lateral part is disposed downwardly of the Y-axis mover.

2. The stage apparatus according to claim 1, wherein the attraction force generating means is constituted from one of either a magnet or a magnetic body disposed on the side of the base and extending along the Y-axis direction, and the other of either the magnet or the magnetic body disposed on the lateral part of the Y-axis movable body.

3. The stage apparatus according to claim 1, wherein the lateral part of the Y-axis movable body supports, on the outside of the lateral part, an air bearing for blowing air on the side of the base.

4. The stage apparatus according to claim 3, wherein the lateral part of the Y-axis movable body has a support part for rotatably supporting the air bearing.

5. The stage apparatus according to claim 4, wherein the support part supports the air bearing by way of a spherically shaped part.

6. The stage apparatus according to claim 5, wherein the air bearing is supported on the support part by elasticity being imparted from an expandable elasticity imparting part disposed surrounding the spherically shaped part.

* * * * *